United States Patent
Schicht et al.

(10) Patent No.: US 6,306,525 B1
(45) Date of Patent: Oct. 23, 2001

(54) TRANSPARENT SUBSTRATE PROVIDED WITH THIN LAYERS HAVING REFLECTION PROPERTIES IN THE INFRARED

(75) Inventors: Heinz Schicht, Bethau; Uwe Schmidt, Falkenberg/Elster; Wilfried Kaiser; Bodo Hryniw, both of Torgau, all of (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/209,817

(22) Filed: Dec. 11, 1998

(30) Foreign Application Priority Data

Dec. 11, 1997  (DE) ................................. 197 55 002

(51) Int. Cl.⁷ ..................................... B32B 15/04
(52) U.S. Cl. ........................... 428/633; 428/469; 428/472; 428/432; 428/433; 428/434; 428/697; 428/699; 428/701; 428/702; 428/336; 428/621; 428/623; 428/632; 359/359; 359/585
(58) Field of Search ................................... 428/195, 201, 428/209, 210, 213, 325, 328, 432, 633, 433, 621, 623, 632, 336, 697, 699, 701, 702; 359/359, 585

(56) References Cited

U.S. PATENT DOCUMENTS 5,709,930   1/1998   DePauw .

FOREIGN PATENT DOCUMENTS

| 195 30 331  | 2/1996  | (DE) . |
| 0593883     | 4/1994  | (EP) . |
| 0226993     | 11/1995 | (EP) . |
| WO 93/20256 | 10/1993 | (WO) . |
| WO 95/29883 | 11/1995 | (WO) . |

*Primary Examiner*—Deborah Jones
*Assistant Examiner*—Jennifer McNeil
(74) *Attorney, Agent, or Firm*—Pennie & Edmonds LLP

(57) ABSTRACT

A thin multilayer coating having reflection properties in the infrared and/or in the solar radiation range of the low-emissivity type for windows comprises a lower dielectric antireflection treatment layer, at least one silver-based functional layer, at least one metallic protection layer adjacent to the silver layer and an upper dielectric antireflection treatment layer. The upper dielectric antireflection treatment layer comprises a lower partial layer made of $SnO_2$, $ZnO$, $TiO_2$, $Bi_2O_3$ or $Al_2O_3$ and an upper partial layer made of a mixed oxide based on zinc and aluminium, especially one having a spinel structure of the $ZnAl_2O_4$ type.

16 Claims, No Drawings

TRANSPARENT SUBSTRATE PROVIDED WITH THIN LAYERS HAVING REFLECTION PROPERTIES IN THE INFRARED

BACKGROUND OF THE INVENTION

The invention relates to a multilayer coating having reflection properties in the infrared and/or in the solar radiation range, particularly of the low-emissivity type, for transparent substrates, particularly windows. This type of multilayer coating comprises a lower dielectric antireflection treatment layer, at least one silver-based functional layer, preferably at least one metallic protection layer deposited on and/or beneath the silver layer, as well as an upper antireflection treatment layer comprising several partial dielectric layers.

In the context of the invention, the lower dielectric antireflection "layer" is composed of one layer or of a superposition of at least two layers of dielectric material, of the metal oxide or nitride type (such as, for example AlN or $Si_3N_4$) or alternatively of a metal oxnitride or silicon oxynitride. Likewise, the upper antireflection "layer" comprises a sequence of several layers based on a dielectric material of the metal oxide type, but it may also comprise other dielectric layers of the nitride or oxynitride type mentioned above.

Low-emissivity multilayer coatings of this kind are known in various forms. They are generally manufactured using a magnetic-field-assisted sputtering process, the metal oxide layers obtained from metal targets being deposited reactively using a reactive gas containing oxygen (and nitrides using a reactive gas containing nitrogen). The metallic protection layers of a metal having a relatively higher affinity for oxygen, immediately adjacent to the silver layer or layers, serve to protect the silver layer from the oxygen which gets in by diffusion, not only during the subsequent process of reactively sputtering the antireflection treatment layer but also during any later heat treatment and during use, depending on their function in coated windows.

As a general rule, coated windows are stacked one on top of another in the form of large packets and are transported over great distances, placed in a slightly inclined position on suitable transportation mountings. In the case of prolonged travel, the layers are exposed to particular mechanical stresses because of vibrations. These mechanical stresses may result in the multilayer coating being damaged, the damage generally being in the form of visual defects of the scratching or scoring kind.

It is knows that multilayer coatings having an "upper" antireflection treatment layer (on top of the functional layer (s) of the silver type), which is composed only of a single metal oxide, for example $SnO_2$, ZnO, $TiO_2$, $Bi_2O_3$ or $Al_2O_3$, are relatively sensitive to mechanical and chemical stresses. This is why various suggestions have been made for producing the antireflection treatment layer in the form of a multilayer structure, for the purpose of improving the chemical and mechanical resistance of multilayer coatings of this kind.

A multilayer coating having improved resistance to environmental conditions and to mechanical stresses is known from document EP-0,593,883 B1. In the case of this known multilayer coating, the upper antireflection treatment layer is composed of a non-metallic triple layer, preferably having two layers of identical chemical composition, zinc oxide and titanium dioxide being preferably sputtered alternately. In this case, a layer of zinc titanate is formed during the coating process, this layer being in the subnanometre range and reinforcing the protecting action of the metallic protection layer placed on the silver layer with respect to environmental influences. Furthermore, a non-metallic surface layer made of $TiO_2$ is preferably placed on the non-metallic triple antireflection treatment layer.

The manufacture of a multilayer coating of this kind, using titanium dioxide layers, is relatively complicated because the titanium dioxide layers can be manufactured only at a relatively low sputtering rate. What is more, it is necessary to provide in the continuous coating plant, for the purpose of applying the triple antireflection treatment layer, at least three cathode positions for the antireflection treatment layer, these not always being present in existing coating plants.

In order to improvre the scratch resistance of the low-emissivity multilayer coating, it is also known to deposit, on the upper antireflection treatment layer, a thin surface layer made of a material of high hardness, particularly $Si_3N_4$, $SiO_2$ or $TiO_2$. Suggestions of this kind are known, for example from the already mentioned document EP 0,593, 883 B1, as well as from document WO 95/29883 and document DE 19530331 A1. However, it has turned out that multilayer coatings, even those provided with hard surface layers of this kind, do not in any way satisfactorily improve the transportation behaviour, at least when the antireflection treatment layer deposited under this surface layer is relatively thin, namely less than 30 nm, which may, however, be necessary in order to obtain defined colours in transmission and/or in reflection. Despite a marked improvement in other mechanical properties, the mechanical damage described is also observed, such as scratching and scoring, even in the case of multilayer coatings provided with a hard surface layer, when packets of windows thus coated are exposed to transportation vibrations during prolonged travel.

SUMMARY OF THE INVENTION

Consequently, the object of the present invention is to develop a multilayer coating having reflection properties in the infrared and/or in the solar radiation range, very particularly of the low-emissivity type, which not only has properties comparable to those of the known multilayer coatings but which furthermore exhibits high mechanical resistance, particularly to the mechanical stresses which occur during long transportation journeys.

The solution according to the invention consists in the fact that, for the multilayer coating of the kind mentioned above, the upper antireflection treatment layer comprises a lower partial layer made of $SnO_2$, ZnO, $TiO_2$, $Bi_2O_3$ or $Al_2O_3$ and an upper partial layer made of a mixed oxide based on zinc and aluminium, especially one having a spinel structure of the $ZnAl_2O_4$ type. The thickness of this mixed oxide layer is preferably at least 2 or 3 nm and is generally chosen to be between 4 and 8 nm.

The terms "lower" and "upper" which are used refer to the relative position of the layers of the multilayer coating depending on their distance from that side of the substrate on which the multilayer coating is deposited, without excluding the presence of additional "interlayers". Thus, the antireflection treatment layer comprises the sequence composed of a lower partial layer and an upper partial layer, but it may also comprise one or more dielectric layers under the "lower partial" layer and/or on the "upper partial" layer.

DETAILED DESCRIPTION OF THE INVENTION

The invention thus applies to multilayer coatings having a functional layer (that is to say a layer which provides the desired thermal function, of the silver type) but also to those having two functional layers in the multilayer coatings which diagramatically are of the type:

dielectric coating 1/Ag/dielectric coating 2/Ag/dielectric coating 3

(Reference may be made, for example, to Patent EP-638,528 in the case of this multilayer coating having two functional layers and to Patent EP-645,352 in the case of a multilayer coating having three silver layers).

The upper partial layer made of a mixed oxide preferably having a spinel structure is advantageously applied by reactive sputtering using a target of the corresponding metal alloy. The metal alloy used preferably has, in this case, a composition which corresponds to the stoichiometric ratio of the metals in the corresponding spinel. In the case of the compound $ZnAl_2O_4$, the stoichiometric composition is at approximately 54.8% by weight of Zn and approximately 45.2% by weight of Al.

Depending on the metal oxide of which the lower partial layer of the upper antireflection treatment layer is composed, it may be appropriate to depart a little from the stoichiometric composition. For example, if the lower partial layer of the antireflection treatment layer is composed of $SnO_2$, $Al_2O_3$ or $TiO_2$, it is advantageous, in order to carry out the sputtering of the upper partial layer, to use a target for which the proportion of zinc in the alloy is slightly superstoichiometric because, in this way, a better formation of spinel at the limitrophe surface is produced. On the other hand, if the lower partial layer of the upper antireflection treatment layer is composed of ZnO, it is recommended to choose, in the case of the $ZnAl_2O_4$ spinel, a target made of an alloy having a slightly superstoichiometric proportion of Al. In the case of the alloy ZnAl, it is preferred to choose a proportion of 40 to 70% by weight of Zn, especially between 50 and 60 % by weight of Zn, and from 30 to 60% by weight of Al, preferably from 40 to 50% of Al.

The layers of mixed oxides mentioned, preferably having a spinel structure, may be deposited by sputtering without any technical difficulty on the lower partial layers. Surprisingly, they have the effect of significantly improving the scratch resistance and, in particular, the transportation stability of the coated windows, this being so even in the case of systems of particularly scratch-sensitive layers.

On the one hand, the observed effect can certainly be explained, in part, by the fact that the Zn/Al mixed oxide, especially when it has a spinel structure, forms a particularly hard mechanical protection layer. On the other hand, it also helps to explain the observed increase in the transportation stability. This probably stems from the fact that this mixed oxide layer, in the form of a spinel, comprises a dense hexagonal or cubic multilayer coating of spheres and consequently forms an extremely effective barrier layer with respect to the diffusion processes. It may in fact be asked that processes of diffusion into the surface layer of the multilayer coating are responsible for the mechanical surface damage observed during transportation. Corresponding studies have, as a result, shown that the silver ions diffuse as far as the surface of the multilayer coating and react there is with the small polyacrylate balls serving as spacing agent. In this case, silver acrylates apparently form on the surface of these balls, as a result of the salts which may age the balls on the surface and lead to encrustation. These aged acrylate balls are apparently one substantial cause of the damage of the multilayer coating due to the action of vibrations during transportation.

An upper antireflection treatment layer produced according to the invention consequently has various advantageous properties which together result in the desired improvement of the multilayer coating, particularly in a substantial improvement to the transportation stability. The high intrinsic hardness provides a higher scratch resistance, the preferred dense spinel structure constitutes an effective diffusion barrier against the diffusion of silver ions, and the mixed oxide mentioned has good surface compatibility with the adjacent layer of metal oxide. Good surface compatibility means that new phases of compounds form at the interface between the layers, these compounds guaranteeing good bonding between these layers and themselves also helping to increase the hardness of the multilayer coating in its entirety and to reduce the possibility of silver-ion diffusion.

According to a non-limiting embodiment of the invention, a surface layer completes the multilayer coating, this surface layer being preferably deposited on the upper partial layer of the upper antireflection treatment layer. This terminal layer may be based on $TiO_2$, $ZrO_2$, $Cr_2O_3$ or a mixture of these oxides, and its geometrical thickness is chosen to be at least 2 nm, especially at least between 2 and 6 or 3 and 5 nm.

The invention is described below with reference to two comparative examples and two embodiment examples. In all cases, samples of windows, which were provided with the corresponding multilayer coating in an industrial magnetron coating plant, were subjected to three tests which clearly show the improvement provided by the invention:

A) The "Lucite" test is described in Patent DE 19530331 A1. In this test, a coated specimen having the dimensions 12×25 cm is put into a chamber, with the multilayer coating uppermost, and sprayed using 100 g of a PMMA powder of the SEPAROL type from Aachener Chemische Werke. The SEPAROL product is a product of strictly controlled purity and particle size and is used extensively as a separating agent between the windows of a packet of glass panes. An uncoated window, of the same dimensions, is then placed on the coated specimen and sprayed using the SEPAROL product. A plate applying a pressure of 3.983 kg is placed on the upper window. The pressure plate is made to undergo a two-and-fro movement with a travel of 5 cm for more than 3000 cycles at a frequency of 60 cycles per minute. After the test, the multilayer coating is examined with regard to scratches and marks in the form of filaments (scoring);

B) The washing test according to the ASTMD 2486 standard, and

C) The so-called "plate method according to Kimmel et al.", Z. Glastecbnische Berichte 59 (1986), page 252 et seq. Using this method, the $Ag^+$ wash-out behaviour of the multilayer coating is determined. The silver contained in the washing solution is determined photometrically.

Comparative Example 1

Specimens of coated float-glass windows were manufactured, having the following layer structure:

glass/40 $SnO_2$/2 CrNi/11 Ag/4 CrNi/24 $SnO_2$, the CrNi layer having been deposited by sputtering from a target of a CrNi alloy containing 20% by weight of Cr and 80% by weight of Ni and the numbers preceding the layer material each time indicating the geometrical thickness of the layer in question, in nm.

The specimens were subjected to the tests mentioned above. The tests gave the following results:

Lucite test: Filamentary marks (scoring) were observed on the multilayer coating at 4 places;

Washing test: Defects and disbonds appeared after 700 forward-and-back movements;

Plate method: The amount of silver contained in the solution after washing was 0.7 mg/l.

Several packets of windows, of dimensions 6.0×3.21 m, each time having a weight of 12 tonnes, with SEPAROL-F powder as interlayer between the windows, were also transported on low-bed lorries over distances of 600 km and then examined visually for scoring on the multilayer coating. Coating damage in the form of scoring was observed on the surface of the windows each time.

Comparative Example 2

Coated float-glass specimens having the same layer structure, but with the thicker upper antireflection treatment layer, were subjected to the same tests. The multilayer coating had the following structure:

glass/40 $SnO_2$/2 CrNi/11 Ag/4 CrNi/44 $SnO_2$.

The results of the three tests on these specimens were as follows:

Lucite Test: Filamentary marks (acoring) appeared at 1 place;

Washing test: Defects and disbonds again appeared after 700 forward-and-back movements;

Plate method: The amount of silver contained in the solution after the washing was 0.15 mg/l.

During the actual transportation test, which was carried out as in the case of Comparative Example 1. individual filamentary marks appeared only in a few exceptional cases.

Embodiment Example 1

Float-glass windows were coated, on the same industrial plant as that used in the comparative examples, so as to have the following layer structure:

glass/40 $SnO_2$/2 CrNi/11 Ag/4 CrNi/20 $SnO_2$/5 $ZnAl_2O_4$.

Next, the $ZnAl_2O_4$ partial layer was applied by reactive sputtering using a metal target composed of 55% by weight of Zn and 45% by weight of Al, the process being carried out with a partial pressure of oxygen in the working gas so as to form an entirely atoichiometric compound. The following results were obtained from these specimens:

Lucite test: No scoring or scratching whatsoever was observed;

Washing test: The first coating defects or disbonds were observed only after 2000 forward-and-back movements;

Plate method: No washed-out silver was observed in the solution.

Actual transportation tests carried out several times on journeys of more than 600 km in open country showed, in no case, damage to the multilayer coating.

Embodiment Example 2

Float-glass windows having a layer structure comparable to Embodiment Example 1 were coated on the same coating plant as that used for the previous examples with, however, an additional surface layer of $TiO_2$ being applied to the upper partial layer of $ZnAl_2O_4$. The sputtering conditions were again adjusted so that the $ZnAl_2O_4$ layer forms in the stoichiometric ratio. The $TiO_2$ top layer was deposited using a (double magnetron sputtering) cathode at a power of 50 kW using a working gas obtained from an $Ar/O_2/N_2$ mixture. The muitilayer coating had the following layer structure:

glass/40 $SnO_2$/2 CrNi/11 Ag/4 CrNi/20 $SnO_2$/3 $ZnAl_2O_4$/4 $TiO_2$

The tests gave the following results:

Lucite test: No scoring or scratching or defeat whatsoever;

Washing test: First coating defects and disbonds only after more than 2600 forward-and-back movements;

Plate method: No washed-out silver was observed in the solution.

Actual transportation tests carried out repeatedly over transportation journeys of more than 600 km in open country demonstrated that there is no damage to the multilayer coating.

In addition, the so-called sweating water test was carried out on these specimens, during which test the specimens are stored at a temperature of 60° C. in air with a relative humidity of 100%. The multilayer coating showed no damage, even after a period of more than 200 hours storage under these conditions. Packets of windows having a multilayer coating of this kind may be stored and shipped without any rim-blocking effect.

It should be noted that mixed oxides based on Zn and Al but not necessarily in stoichiometric proportions allowing a spinel structure to be obtained are also advantageous and form part of the invention, just as do oxides of Zn and Al which also optionally contain minor constituents other than Zn and Al, for example of the impurity type, or oxides of Zn and Al which are slightly nitrided.

The windows according to the invention, once assembled, may be used in buildings or vehicles (cars, planes and trains), especially in the form of insulating multiple-glazing units, single-pane windows or laminated glazing assemblies (the multilayer coatings generally facing the intermediate gas-filled cavity of an insulating glazing unit, or the intermediate sheet of polymer of a laminated glazing assembly).

What is claimed is:

1. In a transparent substrate provided with a thin multilayer coating having reflection properties in the infrared and/or in the solar radiation range of the low-emissivity type, said multilayer coating having a lower dielectric antireflection treatment layer, at least one silver-based functional layer, at least one metallic protection layer placed on and/or beneath the silver-based layer, as well as an upper antireflection treatment layer comprising a sequence of several partial layers of metal oxides, the improvement wherein the upper antireflection treatment layer comprises a lower partial layer made of $SnO_2$, ZnO, $TiO_2$, $Bi_2O_3$ or $Al_2O_3$ and an upper partial layer made of a mixed oxide based on zinc and aluminum, said mixed Zn and Al oxide layer being formed by reactive sputtering using a target based on a ZnAl alloy containing from 40 to 70% by weight of Zn and from 30 to 60% by weight of Al.

2. Substrate according to claim 1, wherein the thickness of the upper partial layer of the upper antireflection treatment layer is at least 2 to 8 nm.

3. Substrate according to claim 1, wherein the upper partial layer of the upper antireflection treatment layer is formed by the reactive sputtering using a target based on a zinc-antireflection alloy containing from 50 to 60% by weight of Zn and from 40 to 50% by weight of Al.

4. Substrate according to claim 1, wherein a surface layer based on $TiO_2$, $ZrO_2$ or $Cr_2O_3$ is placed on the upper partial layer of the upper antireflection treatment layer.

5. Substrate according to claim 4, wherein the surface layer has a geometrical thickness of at least 2 to 6 nm.

6. Substrate according to claim 1 wherein the mixed oxide of the upper partial layer has a spinel structure.

7. In a transparent substrate provided with a thin multilayer coating having reflection properties in the infrared and/or in the solar radiation range, of the low-emissivity type, said multilayer coating having a lower dielectric antireflection treatment layer, at least one silver-based functional layer, at least one metallic protection layer placed on and/or beneath the silver-based layer, as well as an upper antireflection treatment layer comprising a sequence of several partial layers of metal oxides, the improvement wherein the upper antireflection treatment layer comprises a lower partial layer made of $SnO_2$, $ZnO$, $TiO_2$, $Bi_2O_3$ or $Al_2O_3$ in direct contact with an upper partial layer made of a mixed oxide based on zinc and aluminum.

8. Substrate according to claim 7 wherein the direct contact between the upper and lower partial layers comprises an interface of a mixed oxide having a spinel structure.

9. Substrate according to claim 7, wherein the thickness of the upper partial layer of the upper antireflection treatment layer is at least 2 to 8 nm.

10. Substrate according to claim 7, wherein a surface layer based on $TiO_2$, $ZrO_2$ or $Cr_2O_3$ is placed on the upper partial layer of the upper antireflection treatment layer.

11. Substrate according to claim 10, wherein the surface layer has a geometrical thickness of at least 2 to 6 nm.

12. In a transparent substrate provided with a thin multilayer coating having reflection properties in the infrared and/or in the solar radiation range, of the low-emissivity type, said multilayer coating having a lower dielectric antireflection treatment layer, at least one silver-based functional layer, at least one metallic protection layer placed on and/or beneath the silver-based layer, as well as an upper antireflection treatment layer comprising a sequence of several partial layers of metal oxides, the improvement wherein the upper antireflection treatment layer comprises a lower partial layer made of $SnO_2$, $ZnO$, $TiO_2$, $Bi_2O_3$ or $Al_2O_3$ and an upper partial layer made of a mixed oxide based on zinc and aluminum and having a spinel structure.

13. Substrate according to claim 12, wherein the thickness of the upper partial layer of the upper antireflection treatment layer is at least 2 to 8 nm.

14. Substrate according to claim 12, wherein a surface layer based on $TiO_2$, $ZrO_2$ or $Cr_2O_3$ is placed on the upper partial layer of the upper antireflection treatment layer.

15. Substrate according to claim 14, wherein the surface layer has a geometrical thickness of at least 2 to 6 nm.

16. Substrate according to claim 12 wherein the mixed oxide of the upper partial layer comprises $ZnAl_2O_4$.

* * * * *